United States Patent [19]

Benedict

[11] Patent Number: 5,421,169

[45] Date of Patent: Jun. 6, 1995

[54] AIR CONDITIONING APPARATUS, ESPECIALLY FOR AN ELECTRIC VEHICLE

[75] Inventor: Olusegun O. Benedict, Les Ulis, France

[73] Assignee: Valeo Thermique Habitacle, Le Mesnil Saint Denis, France

[21] Appl. No.: 142,269

[22] Filed: Oct. 25, 1993

[30] Foreign Application Priority Data

Oct. 26, 1992 [FR] France .................. 92 12741

[51] Int. Cl.⁶ .................................. B60H 1/32
[52] U.S. Cl. ........................ 62/244; 62/434; 165/42
[58] Field of Search ............ 62/244, 434, 435; 165/42, 43

[56] References Cited

U.S. PATENT DOCUMENTS

| | | | | |
|---|---|---|---|---|
| 2,017,579 | 10/1935 | Anderson | | 165/43 |
| 2,257,975 | 10/1941 | Miller et al. | | 165/43 X |
| 2,893,218 | 7/1959 | Harnish | | 62/435 X |
| 3,024,008 | 3/1962 | Blum | | 62/435 X |
| 3,127,928 | 4/1964 | Ringquist | | 62/435 X |
| 3,675,411 | 7/1972 | Perez | | 62/434 X |

FOREIGN PATENT DOCUMENTS

| | | |
|---|---|---|
| 0431760 | 6/1991 | European Pat. Off. . |
| 0504653 | 9/1992 | European Pat. Off. . |
| WO9216389 | 10/1992 | WIPO . |

Primary Examiner—William E. Tapoical
Attorney, Agent, or Firm—Morgan & Finnegan

[57] ABSTRACT

The apparatus comprises a circuit of liquid-vapor refrigerant comprising an evaporator and a condenser, both of the fluid-liquid type, and a variable liquid circuit enabling liquid to be circulated, in a summer configuration, between the evaporator and an air conditioning radiator on the one hand and between the condenser and an outer radiator on the other hand, and in winter between the evaporator and the outer radiator on the one hand, and between the condenser and the air conditioning radiator on the other hand. The apparatus is particularly applicable to the air-conditioning of the passenger space of an electric vehicle.

6 Claims, 3 Drawing Sheets

AIR CONDITIONING APPARATUS, ESPECIALLY FOR AN ELECTRIC VEHICLE

FIELD OF THE INVENTION

The invention relates to air conditioning apparatus for the passenger space of a vehicle, in which a refrigerant circulates in a univocal manner between an evaporator where it receives heat and a condenser where it yields heat.

BACKGROUND OF THE INVENTION

Apparatus of this kind is generally used in order to cool, in particular in summer, a flow of air to be conveyed into the passenger space, by bringing it into contact with the evaporator.

When it is desired to heat the flow of air before conveying it into the passenger space, the heat emitted by the thermal driving engine of the vehicle is normally used for this purpose.

In the case of an electric vehicle, the heat produced by the electrical driving system is not adequate, in winter, to meet the heating requirements of the passenger space. It is then necessary to provide an auxiliary heat source.

It is one object of the invention to make use of, for the heating of the passenger space, the existing air conditioning apparatus, without changing the direction of circulation of the refrigerant.

Another object of the invention is to limit the stresses to which the evaporator, in particular, is subjected, by improving the heat exchange efficiency.

Yet another object is to enable an optimisation of the disposition of the different components of the apparatus within the vehicle.

DISCUSSION OF THE INVENTION

The invention is directed in particular to apparatus of the kind defined in the introduction, and provides that the evaporator and the condenser are fluid-liquid heat exchangers, the evaporator receiving the heat of a liquid which circulates between it and a third liquid-air heat exchanger itself receiving heat from a first flow of air, and the condenser yielding heat to a liquid which circulates between it and a fourth liquid-air heat exchanger, itself yielding heat to a second flow of air, means being provided to convey the first flow of air into the passenger space to cool it in summer and to convey the second flow of air into the passenger space to heat it in winter.

The heat exchange efficiency at the level of the evaporator is better between the refrigerant and the liquid in the apparatus according to the invention than between the refrigerant and a flow of air in known apparatus. Furthermore, as neither the evaporator nor the condenser are in direct contact with the flows of air to be conveyed into the passenger space, the refrigerant circuit may be located at a place where there is adequate available space to house it.

Other characteristics, be they complementary or alternative, of the apparatus according to the invention, are as follows:

the apparatus may comprise an air conditioning heat exchanger disposed in the path of a flow of air towards the passenger space and an outer heat exchanger disposed in the path of a flow of air outside the passenger space, these two exchangers respectively forming the third exchanger and the fourth exchanger in a first configuration of the apparatus, which can be used in summer, and forming respectively the fourth exchanger and the third exchanger in a second configuration of the apparatus, which can be used in winter;

the evaporator, the condenser, the air conditioning exchanger and the outer exchanger are suitably mounted respectively in first, second, third and fourth branches of a liquid circuit, switching means being provided to bring the third and fourth branches into a loop with the first and second branches respectively in the first configuration and with the second and first branches respectively in the second configuration;

the switching means may comprise eight connecting branches of said liquid circuit, i.e. fifth and sixth branches capable of connecting the first and third branches in order to form a first closed loop, seventh and eight branches capable of connecting the second and fourth branches in order to form a second closed loop, ninth and tenth branches capable of connecting the first and fourth branches in order to form a third closed loop, eleventh and twelfth branches capable of connecting the second and third branches in order to form a fourth closed loop, a first three-way valve having a first path connected to one end of one of the first and third branches, a second path connected to one end of the fifth branch and a third path connected to one end of one of the ninth and eleventh branches, a second three-way valve having a first path connected to one end of one of the first and third branches, a second path connected to one end of the sixth branch and a third path connected to one end of one of the tenth and twelfth branches, a third three-way valve having a first path connected to one end of one of the second and fourth branches, a second path connected to one end of the seventh branch and a third path connected to one end of one of the ninth and eleventh branches, a fourth three-way valve having a first path connected to one end of one of the second and fourth branches, a second path connected to one end of the eight branch and a third path connected to one end of one of the tenth and twelfth branches, and coordinated control means capable of placing in communication the first paths of the first, second, third and fourth valves with their second paths in order to establish the first configuration and with their third paths in order to establish the second configuration;

the invention may incorporate a supplementary heat exchanger disposed in the path of a flow of air for demisting the windshield of the vehicle, and means for circulating the liquid in said supplementary exchanger, in parallel with the evaporator, in the second configuration; and the circulation of the liquid in the supplementary exchanger may be interrupted in the first configuration.

Other characteristics and advantages of the invention will become apparent by studying the following detailed description and the attached drawings, which are given by way of example only.

DETAILED DESCRIPTION OF THE PREFERRED EMBODIMENTS

Figure 1:
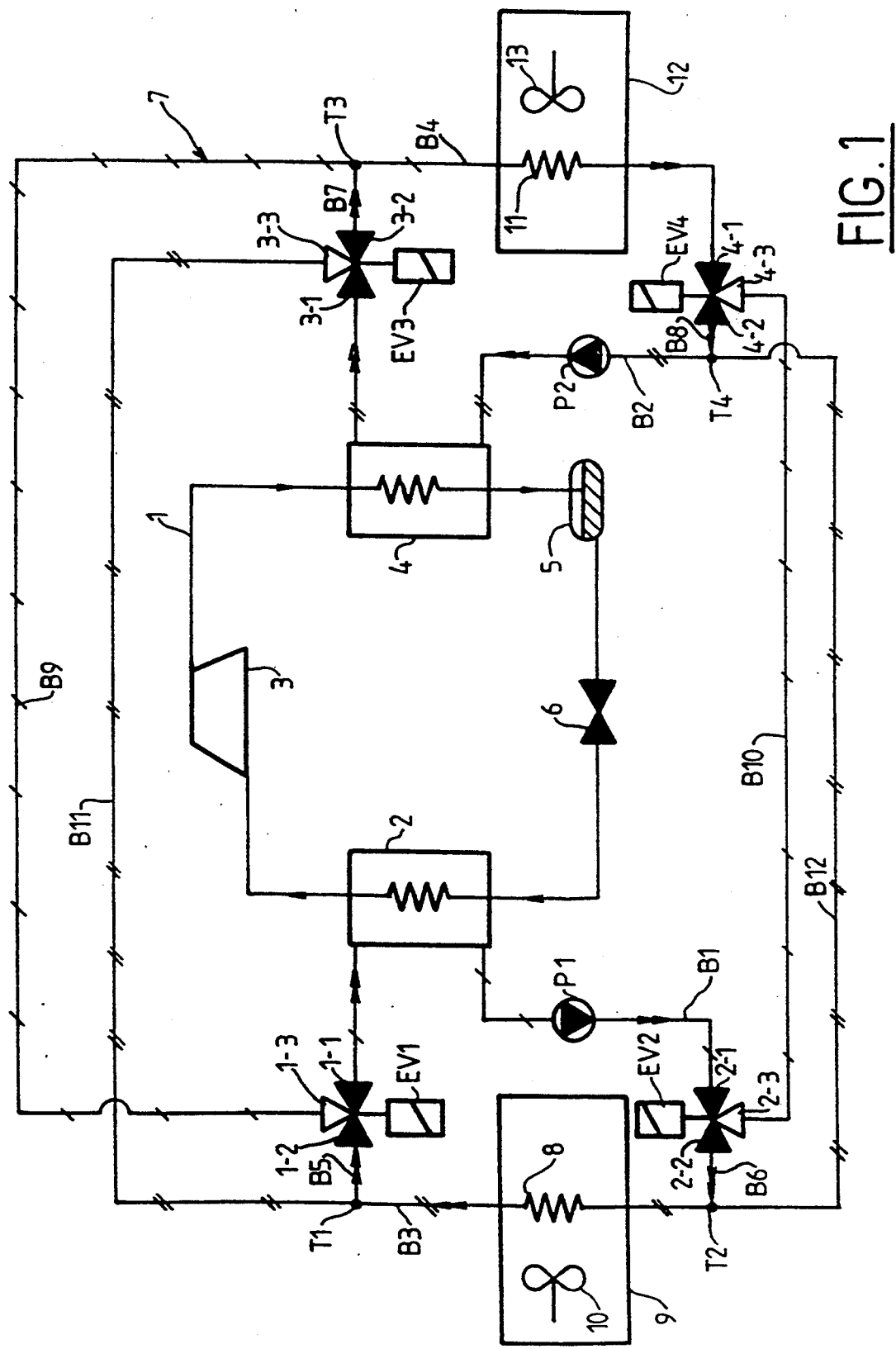
FIGS. 1 and 2 are diagrammatic representations of an air conditioning apparatus according to the invention, respectively in a summer configuration and in a winter configuration.
Figure 2:
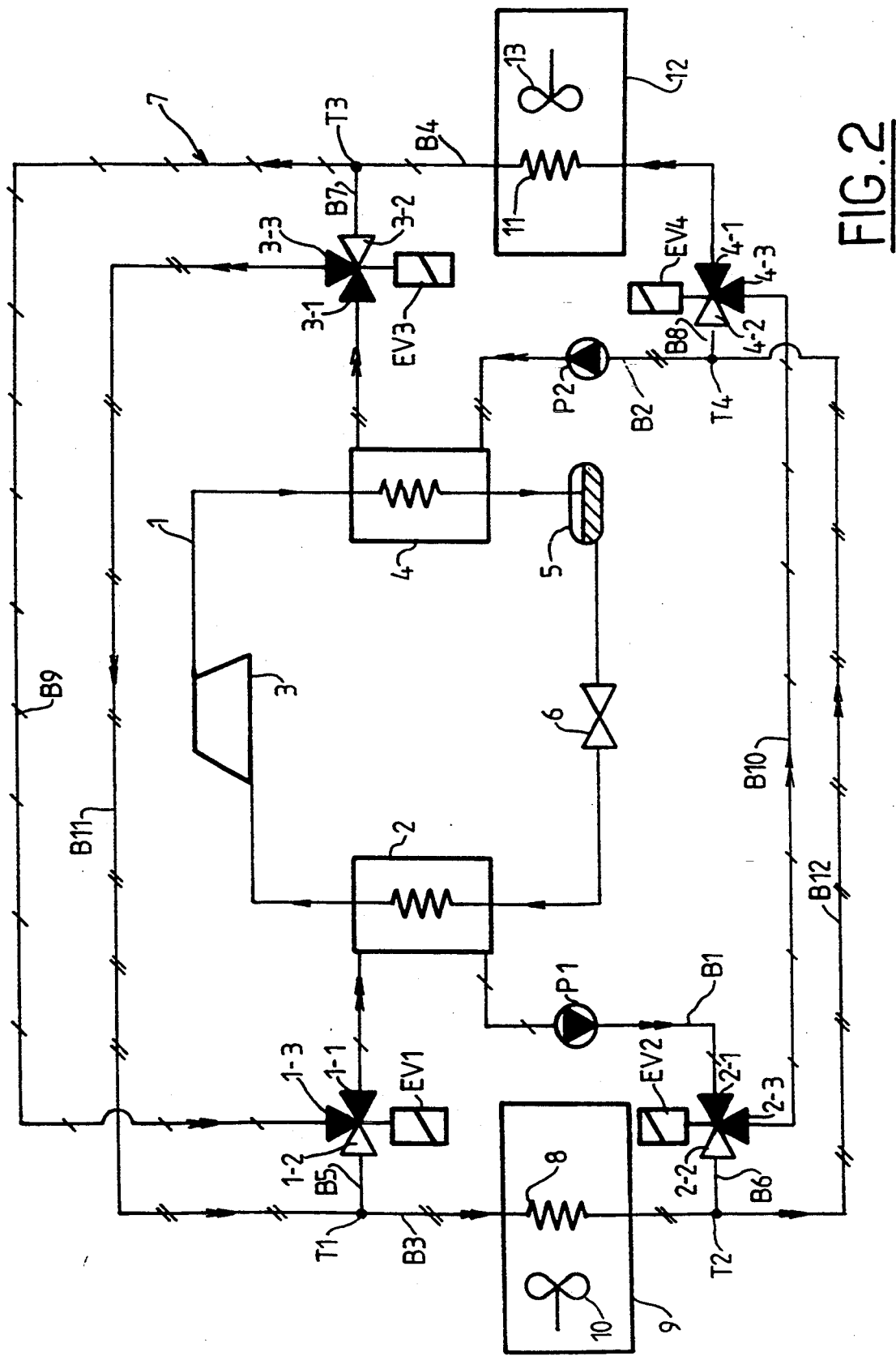

The apparatus illustrated in FIGS. 1 and 2 is intended for the air conditioning of an electrically powered vehicle. It comprises a refrigerant circuit 1 in which circulates a refrigerant moving between the liquid state and the gaseous state, in particular a hydrocarbon-based fluid, and comprising, in the conventional manner, an evaporator 2, a compressor 3, a condenser 4, a cylinder/dehumidifier 5 and an expansion valve 6.

According to the invention, the evaporator 2 and the condenser 4 are fluid-liquid heat exchangers in which an exchange of heat occurs between the refrigerant in circuit 1 and a liquid circulating in a second circuit 7. For this purpose, the evaporator and the condenser are mounted respectively in branches B1 and B2 of circuit 7, which also comprise circulation pumps P1 and P2.

Two liquid-air heat exchangers or radiators are moreover mounted in branches B3 and B4 of circuit 7, i.e. respectively a passenger space radiator 8 located in the passenger space 9 of the vehicle, in the path of a flow of air produced by an electric fan unit 10 in order to be conveyed to the interior of the passenger space, and an outer radiator 11 disposed in the engine compartment 12 of the vehicle, in the path of a flow of air produced by an electric fan unit 13 and circulating entirely outside the passenger space. The circuit 7 also comprises eight connecting branches and four three-way solenoid valves controlled in a coordinated manner, enabling the two configurations illustrated respectively in FIGS. 1 and 2 to be established, in each of which the liquid circulates independently, firstly between the evaporator and one of the radiators 8 and 11, and secondly between the condenser and the other radiator.

The two ends of a connecting branch B5 are connected respectively to a second 1-2 path of a three-way solenoid valve EV1, a first 1-1 path of which is connected to a first end of branch B1, and to a first end T1 of branch B3. Similarly, the two ends of a connecting branch B6 are connected respectively to a second 2-2 path of a three-way solenoid valve EV2, a first 2-1 path of which is connected to the second end of branch B1, and to the second end T2 of branch B3. A connecting branch B7 has its ends connected respectively to a second 3-2 path of a three-way solenoid valve EV3, a first 3-1 path of which is connected to a first end of branch B2, and its second end connected to a first end T3 of branch B4. Another connecting branch B8 has its ends connected respectively to the second end T4 of branch B2, and to a second 4-2 path of a three-way solenoid valve EV4, the first 4-1 path of which is connected to the second end of branch B4. The ends of a connecting branch B9 are connected respectively to the third 1-3 path of solenoid valve EV1 and to the junction T3, those of a connecting branch B10 to the third 2-3 and 4-3 paths of solenoid valves EV2 and EV4, the ends of a connecting branch B11 to the junction T1 and to the third 3-3 path of solenoid valve EV3 and finally those of a connecting branch B12 to junctions T2 and T4.

To establish the first configuration of the device, illustrated in FIG. 1, each of the solenoid valves EV1, EV2, EV3 and EV4 is controlled so as to bring into communication its first and second paths. A first closed loop of the liquid circuit 7 is therefore formed by branches B1, B6, B3 and B5. The liquid circulates in this loop by means of the pump P1. The liquid, for example an aqueous solution of glycol or oil, yields the heat to the refrigerant in circuit 1 in the evaporator 2 and from it receives the flow of air produced by the electric fan unit 10 in the radiator 8. This flow of air is therefore cooled and enables, in summer, the environment of the vehicle's passenger space to be cooled. A second closed loop of circuit 7 is formed by branches B2, B7, B4 and B8, and the liquid circulates there as a result of the pump P2. The refrigerant transmits to the liquid, in the condenser 4, the heat which it receives in evaporator 2, and this heat is yielded by the liquid, in the radiator 11, to the flow of air produced by the electric fan unit 13, and is thus dissipated to the exterior of the passenger space. No liquid circulates in branches B9 to B12.

In the second configuration illustrated in FIG. 2, the solenoid valves EV1 to EV4 are on the contrary controlled so as to bring into communication the first paths with the third paths. A first closed loop of circuit 7 is formed by branches B1, B10, B4 and B9, in which the liquid circulates by means of the pump P1. This liquid yields heat to the refrigerant in the evaporator 2, and receives from it, in the radiator 11, the flow of air produced by the electric fan unit 13. In a second closed loop formed by branches B2, B11, B3 and B12, the liquid circulates by means of the pump P2, receives heat of the refrigerant in the condenser 4 and yields it, in the radiator 8, to the flow of air produced by the electric fan unit 10, enabling it to heat the passenger space in winter. The operating balance of the device therefore comprises the drawing of heat outside the passenger space and its transfer to inside this space.

Figure 3:
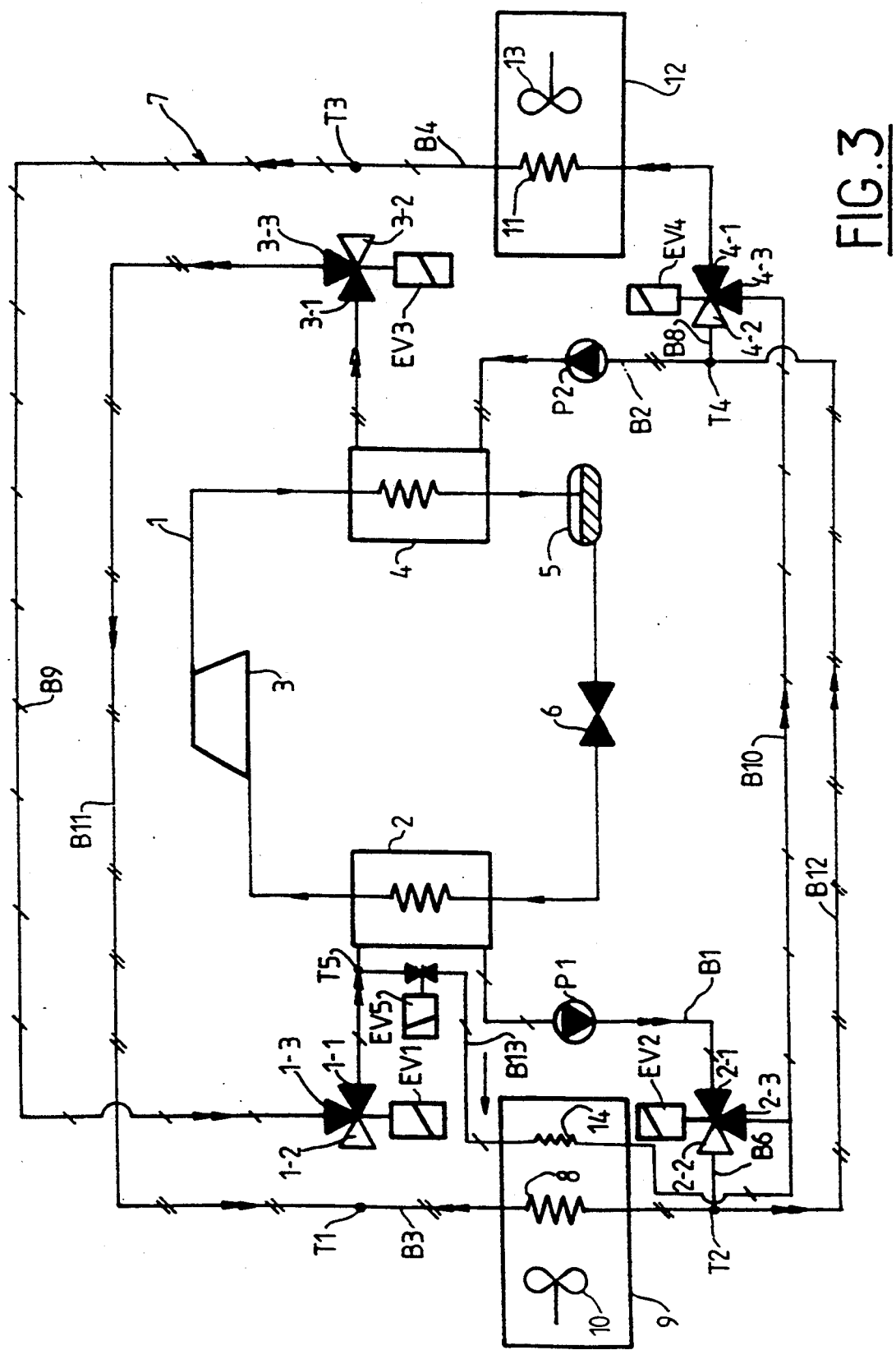
FIG. 3 is a diagrammatic representation similar to FIG. 2, showing a refinement of the apparatus.

The apparatus shown in FIG. 3 comprises the same components as those in FIGS. 1 and 2, designated by the same reference signs. It comprises an additional branch B13 of the liquid circuit 7, the ends of which are connected respectively to branch B1, at a junction T5 situated between the evaporator 2 and the solenoid valve EV1, and to branch B10 at a junction T6 situated between the solenoid valves EV2 and EV4. On branch B13 are mounted a regulating solenoid valve EV5 and an additional radiator 14 disposed in the passenger space 9, in the path of a fraction of flow of air intended to defrost/demist the windshield of the vehicle. When the device is in its "summer" configuration, in which branch B10 is isolated by solenoid valves EV2 and EV4, no liquid circulates in branch B13, which opens at T6 into the former. On the contrary, in the "winter" configuration, branch B13 is parallel to branch B1 by the intermediary of the 2-1/2-3 passage of solenoid valve EV2. The partial or total opening of solenoid valve EV5 causes a division of the liquid between the evaporator 2 and the radiator 14. The liquid passing through radiator 14, partially cooled by passing into radiator 8, enables the flow of demisting air which can be regulated by solenoid valve EV5 to be heated.

In the examples described, three three-way valves EV1, EV2 and EV3 are directly connected to the branches of the liquid circuit containing the evaporator and the condenser, the fourth three-way solenoid valve EV4 being connected directly to branch B4 containing the external radiator 11. In general, according to the invention, each of these four solenoid valves may be connected directly, as selected, to one of the branches containing the evaporator and the condenser or to one of the branches containing the air conditioning outer radiator.

In these same examples, circulation pumps P1 and P2 are mounted in branches B1 and B2, and the direction of circulation of the liquid in branches B3 and B4 is reversed from the first configuration to the second configuration. The pumps could also be mounted in branches B3 and B4, the inversion in the direction of circulation being produced in branches B1 and B2.

What is claimed is:

1. Air conditioning apparatus for the passenger space of a vehicle, in particular an electrically powered vehicle of the kind in which a refrigerant circulates in a univocal manner between an evaporator where it receives heat and a condenser where it gives up heat, wherein said evaporator and said condenser are fluid-liquid heat exchangers the evaporator receiving heat from a liquid which circulates between it and a third liquid-air heat exchanger, itself receiving heat from a first flow of air, and the condenser giving up heat to a liquid which circulates between it and a fourth liquid-air heat exchanger, itself giving up heat to a second flow of air, and means operable to convey the first flow of air into the passenger space to cool it in summer and to convey the second flow of air into the passenger space to heat it in winter:

wherein an air conditioning heat exchanger is disposed in the path of a flow of air towards the passenger space, and an outer heat exchanger is disposed in the path of a flow of air outside the passenger space, these two said heat exchangers respectively forming the third exchanger and the fourth exchanger in a first configuration of the device, which can be used in summer, and respectively forming the fourth exchanger and the third exchanger in a second configuration of the device, which can be used in winter:

wherein the evaporator, the condenser, the air conditioning heat exchanger and the outer heat exchanger are mounted respectively in first, second, third and fourth branches of a liquid circuit, switching means provided to bring the third and fourth branches into a loop with the first and second branches respectively in the first configuration and with the second and first branches respectively in the second configuration:

wherein said switching means comprises eight connecting branches of said liquid circuit, having fifth and sixth branches connecting the first to form a first closed loop, seventh and eighth branches connecting the second and fourth branches to form a second closed loop, ninth and tenth branches connecting the first and fourth branches to form a third closed loop, and eleventh and twelfth branches connecting the second and third branches to form a fourth closed loop; a first three-way valve having a first path connected to one end of one of the first and third branches, a second path connected to one end of the fifth branch and a third path connected to one end of one of the ninth and eleventh branches; a second three-way valve having a first path connected to one end of one of the first and third branches, a second path connected to one end of the sixth branch and a third path connected to one end of one of the tenth and twelfth branches; a third three-way valve having a first path connected to one end of one of the second and fourth branches, a second path connected to one end of the seventh branch and a third path connected to one end of one of the ninth and eleventh branches; a fourth three-way valve having a first path connected to one end of one of the second and fourth branches, a second path connected to one end of the eighth branch and a third path connected to one end of one of the tenth and twelfth branches; and coordinated control means placing in communication the first paths of the first, second, third and fourth valves with their second paths to establish the first configuration and with their third paths to establish the second configuration.

2. Apparatus according to claim 1, wherein two circulation pumps are mounted in said first and second branches respectively.

3. Apparatus according to claim 1, wherein two circulation pumps are mounted in said third and fourth branches respectively.

4. Apparatus according to claim 3, wherein the direction of circulation of the liquid is reversed, from the first configuration to the second configuration, in whichever of the first, second, third and fourth branches do not comprise circulation pumps.

5. Apparatus according to claim 1, further comprising a supplementary heat exchanger disposed in the path of a flow of air for demisting the windshield of the vehicle, and means to circulate the liquid in said supplementary heat exchanger, in parallel with the evaporator, in said second configuration.

6. Apparatus according to claim 5, wherein the circulation of liquid in said supplementary heat exchanger is interrupted in the first configuration.

* * * * *